US006257608B1

(12) United States Patent
Hanson

(10) Patent No.: US 6,257,608 B1
(45) Date of Patent: Jul. 10, 2001

(54) APPARATUS FOR PROPELLING A WHEEL CHAIR

(75) Inventor: Thomas W. Hanson, Loveland, OH (US)

(73) Assignee: Hill-Rom, Inc., Batesville, IN (US)

(*) Notice: Subject to any disclaimer, the term of this patent is extended or adjusted under 35 U.S.C. 154(b) by 0 days.

(21) Appl. No.: 09/352,600

(22) Filed: Jul. 13, 1999

(51) Int. Cl.[7] .......... B62M 1/14

(52) U.S. Cl. .......... 280/250.1; 280/242.1; 280/249

(58) Field of Search .......... 280/250.1, 304.1, 280/242.1, 249; 297/DIG. 4; 74/552, 557

(56) References Cited

U.S. PATENT DOCUMENTS

| | | | | |
|---|---|---|---|---|
| 4,380,343 | | 4/1983 | Lovell et al. . | |
| 4,555,121 | | 11/1985 | Lockard et al. . | |
| 4,625,984 | | 12/1986 | Kitrell . | |
| 4,732,402 | * | 3/1988 | Lambert | 280/250.1 |
| 5,037,120 | * | 8/1991 | Parisi | 280/250.1 |
| 5,211,414 | | 5/1993 | Galumbeck . | |
| 5,669,619 | * | 9/1997 | Kim | 280/250.1 |
| 5,988,661 | * | 11/1999 | Garfinkle | 280/250.1 |

FOREIGN PATENT DOCUMENTS

| | | | | |
|---|---|---|---|---|
| 3116087 | * | 1/1994 | (DE) | 280/250.1 |
| 196 32 681 C2 | | 3/1997 | (DE) . | |
| 2658718 | * | 1/1994 | (FR) | 280/250.1 |
| 2136742 | * | 9/1984 | (GB) | 280/250.1 |
| 5220196 | * | 8/1993 | (JP) | 280/250.1 |
| 2006215 | * | 1/1994 | (RU) | 280/250.1 |

OTHER PUBLICATIONS

*Service Manual,* "Senior Seating™ Collection" from Hill–Rom; product manual 124; 93 pages, Undated.

* cited by examiner

*Primary Examiner*—Daniel G. DePumpo
(74) *Attorney, Agent, or Firm*—Barnes & Thornburg

(57) ABSTRACT

An apparatus for propelling a wheelchair includes a spokeless power ring connected to the wheel chair, and a drive wheel supporting the chair and engaging the floor. The power ring and drive wheel are coupled together in such a way that rotation of the power ring drives the drive wheel proportional to the rotation of the power ring.

28 Claims, 3 Drawing Sheets

APPARATUS FOR PROPELLING A WHEEL CHAIR

BACKGROUND AND SUMMARY OF THE INVENTION

This invention relates to wheelchairs, and more particularly to an apparatus for propelling a wheelchair. More particularly, this invention relates to a wheelchair having a hand-operable drive ring mounted separately from the drive wheel.

Wheelchairs and invalid chairs are well known and typically consist of a chair frame disposed between two sets of rear and front wheels with the rear wheel acting as the drive wheel and the front wheel being castered or rotatable to allow for turning the chair. In standard wheelchair construction, the rear drive wheel is designed to be directly engaged by the occupant's hands to propel the chair or a separate ring is mounted about the same axis of rotation as the drive wheel for the occupant to use to propel the drive wheel.

According to the current design of wheelchairs, the occupant's hands, arms or clothes may come in contact with the ground-engaging surface of the drive wheel resulting in the transfer of debris to their hands or clothes.

In some alternative designs of wheelchairs, a hand wheel is mounted to the frame of the wheelchair and this hand wheel rotates about a separate axis which is located above the axle of the drive wheel. These hand wheels have an outer rim which is connected by a spoke or series of spokes to a hub that is rotatably mounted to an axle. The hub or axle is then coupled by a belt or chain to the drive wheel so that rotation of the hand wheel will cause rotation of the drive wheels. The spokes of these separate hand wheels or the hub upon which the rim is mounted may interfere with the user grasping the rim when attempting to propel the wheelchair. Occupants may need to be cautious in selecting their hand location on the hand wheel or may need to modify their grips to accommodate the spokes or hubs of the hand wheel.

According to the present invention, an apparatus for propelling a chair across a surface upon which the chair rests consists of a chair frame suitable for occupancy by a person having propulsion mechanisms attached to and partially extending below the chair frame to engage the surface for propelling the chair frame across the surface upon which the chair rests. A spokeless propulsion control ring is rotatably mounted to the chair frame entirely above the surface-engaging portion of the propulsion mechanism and is coupled to the propulsion mechanism so that rotation of the spokeless propulsion control ring activates the propulsion mechanism.

In the described embodiments, the apparatus for propelling a chair across a surface has a chair frame with a seat disposed between the sides of the chair frame and a set of rear drive wheels rotatably mounted on separate axle pins on opposite lower rear sides of the frame. A pair of castered or rotatable front wheels are attached on opposite sides of the lower front portion of the frame to engage the surface and aid in steering the chair. A pair of spokeless propulsion control rings or power rings are rotatably mounted on opposite sides of the chair to rotate about an imaginary axis located above the axis of the axles about which the drive wheels rotate. The power rings are mounted to the chair using a plurality of pinch rollers rotatably mounted to each side of the frame and arranged to define planes of rotation and axes of rotation for the power rings.

The pinch rollers are oriented so that the portion of the roller which engages the power ring is located on a circle concentric about the axis of rotation of the propulsion control ring. Sufficient rollers are provided to define and restrict the motion of the power rings to a circle about the axis of rotation of the power rings.

At least one of these pinch rollers, known as the drive pinch roller, on each side of the frame is provided with a pulley for coupling the drive pinch roller, and therethrough its associated power ring, to the drive wheel of the chair. A continuous loop coupler such as a belt or chain extends between the pulley on each drive pinch roller and a pulley on the axle of its associated drive wheel. Thus, rotation of the power ring induces rotation of the drive pinch roller which in turn, through the continuous loop coupler, induces rotation of the drive wheel causing the chair to move across the surface upon which it sits.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
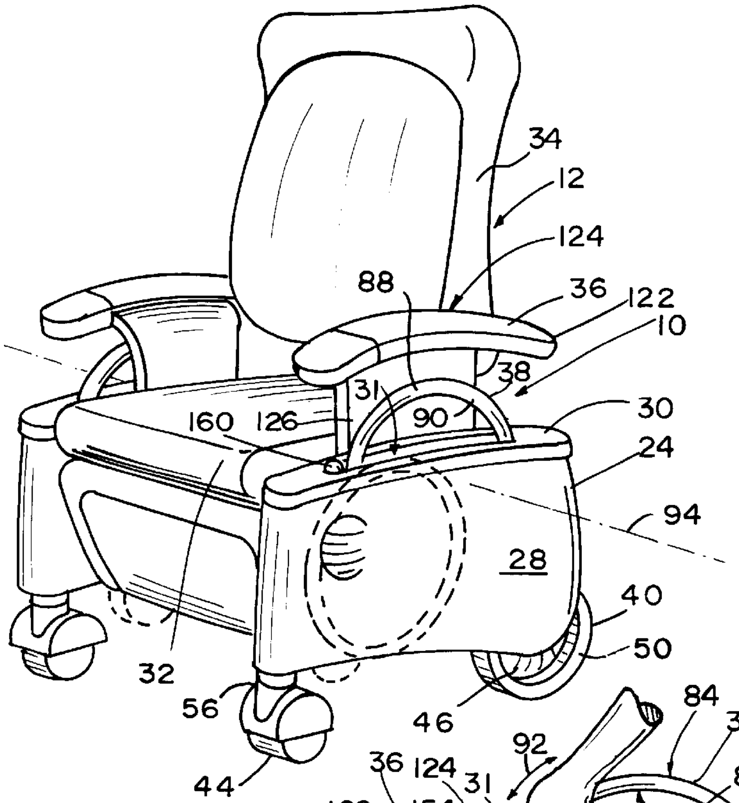
FIG. 1 is a perspective view of the apparatus for propelling a wheelchair in accordance with a first embodiment of the present invention showing the spokeless propulsion control rings or power rings in a first position, depicted in solid lines, wherein a substantial portion extends above an upper surface of a side compartment of the wheelchair and in a second position, depicted in phantom lines, wherein the power ring is entirely below the upper surface of the side compartment of the wheelchair.

FIGS. 1–4 depict a first embodiment of the propulsion apparatus 10 for propelling a wheelchair 12 in accordance with the present invention. Wheelchair 12 includes a frame 14, a pair of side compartments 24, a seat 32, a backrest 34, a pair of arm rests 36, a pair of propulsion control rings (or power rings) 38, a pair of ground-engaging drive wheels 40, a pair of ring-to-drive wheel couplers 42, and a pair of castered front wheels 44. Frame 14 includes a pair of front uprights 16, a pair of rear uprights 18, a pair of upper members 20, and a pair of lower members 22. Each side compartment 24 includes an inner wall 26, an outer wall 28, and an upper surface 30. Seat 32 and back rest 34 are coupled together and mounted to frame 14 to support an occupant. Left and right side compartments 22 ("left" and "right" being defined from the perspective of a forward facing occupant of the wheelchair 12) are attached to left and right upper members of frame 14 respectively, with seat 32 and backrest 34 being positioned to lie therebetween.

Since wheelchair 12 is substantially symmetrical about a plane extending parallel between the left side and the right side, in completing this description the elements of wheelchair 12 will be described on one side only, it being understood that the mirror image components on the opposite side of wheelchair 12 are arranged and interact in substantially the same manner unless otherwise stated.

Drive wheel 40 is rotatably mounted to frame 14 and is coupled to power ring 38 by ring-to-drive wheel coupler 42. Rotation of power ring 38 is translated by ring-to-drive wheel coupler 42 into rotation of drive wheel 40 so that rotation of power ring 38 by occupant induces propulsion of wheelchair 12 without the occupants hands coming in contact with, or coming near to, drive wheel 40.

While a standard wheel chair configuration could be easily modified to incorporate this novel propulsion apparatus 10, the illustrated embodiments depict the propulsion apparatus 10 incorporated into a wheelchair 12 having an outward appearance similar to a conventional arm chair or reclining chair. This may aid in alleviating the concerns of a long or short term convalescent regarding the perception of a stigma attached to being wheelchair bound.

Drive wheel 40 includes a rim 46 having a hub 48 and a tire 50 mounted to the rim 46. Drive wheel 40 is rotatably mounted to lower member 22 of frame 14 near rear upright 18 of frame 14 by fastener 52 acting as a pivot pin or axle extending through both the hub 48 of the drive wheel 40 and lower member 22 of frame 14 as shown, for example in FIG. 4. Drive wheel 40 has a diameter 54 substantially smaller than the drive wheels of a standard wheelchair. This smaller diameter 54 aids in incorporation of the propulsion apparatus 10 into a wheelchair 12 having an appearance more closely approaching that of a conventional armchair or recliner than the conventional wheelchair, as shown, for example in FIGS. 1–3 and 5–6. Front wheel 44 is mounted to caster 56 to allow the front wheel 44 to swivel to aid in directional changes in the motion of the wheelchair 12. Caster 56 and front wheel 44 are mounted to lower member 22 of frame 14 near front member 16, as shown for example, in FIG. 1.

Ring-to-drive wheel coupler 42 includes a bracket 58, a drive sprocket 60, a driven sprocket 62, a drive pinch roller 64, a plurality of pinch rollers 66, 68, 70, and a chain 71. In wheelchair 12 the plurality of pinch rollers include outer forward pinch roller 66, inner forward pinch roller 68, and outer rear pinch roller 70. Pinch rollers 66, 68, 70 are rotatably mounted to bracket 58 by fasteners 72 acting as axles and drive pinch roller 64 is rotatably mounted to bracket 58 by a fastener 74 acting as a pivot pin or axle as shown, for example, in FIGS. 2–4.

Bracket 58 is pivotally mounted to frame 14 by the same fastener 52 acting as pivot pin that rotatably attaches drive wheel 40 to frame 14. Fastener 52 also rotatably mounts driven sprocket 62 to bracket 58 and to frame 14. In order for rotation of driven sprocket 62 to induce rotation of drive wheel 40, driven sprocket 62 and drive wheel 40 must be coupled to prevent relative movement between the two. Driven sprocket 62 may be integrally formed with hub 48 of drive wheel 40, or otherwise connected to drive wheel 40, as shown, for example, by weld bead 76 in FIG. 4.

Drive sprocket 60 is rotatably mounted to bracket 58 by the same fastener 74 that rotatably mounts drive pinch roller 64 to bracket 58. In order for rotation of drive pinch roller 64 to induce rotation of drive sprocket 60, drive sprocket 60 and drive pinch roller 64 must be coupled to prevent relative movement between the two. Drive sprocket 60 may be integrally formed with drive pinch roller 64, or otherwise connected thereto, as shown, for example, by weld bead 78 in FIG. 4.

Spokeless propulsion control ring, or power ring 38, is rotatably mounted to bracket 58 which in turn is pivotably mounted to frame 14. While the power ring 38 can be rotatably mounted directly to frame 14, mounting of power ring 38 to bracket 58 which is pivotally mounted to frame 14 allows power ring 38 to assume multiple positions, at least one of which positions power ring 38 where it can be rotated by the occupant of wheelchair 12. This capability will be described later in the application.

Figure 2:
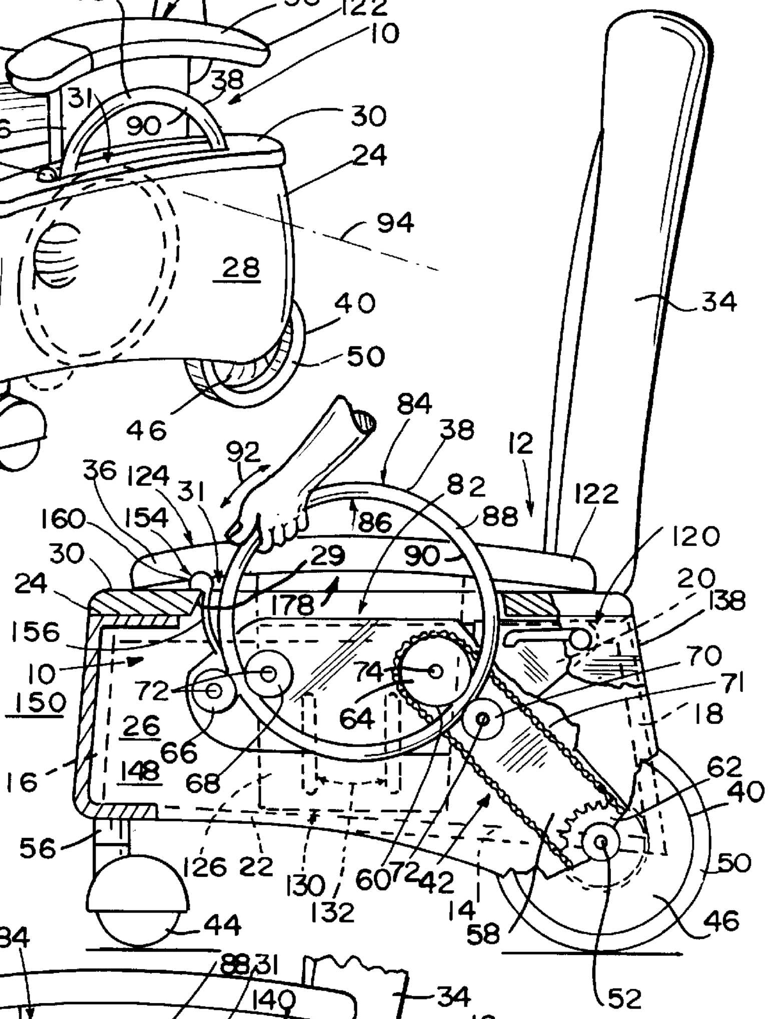
FIG. 2 is a partial cutaway left side elevation view of the apparatus for propelling a wheelchair of FIG. 1 showing the power ring in the first position wherein a substantial portion is located above the upper surface of the side compartment of the wheelchair.
Figure 3:
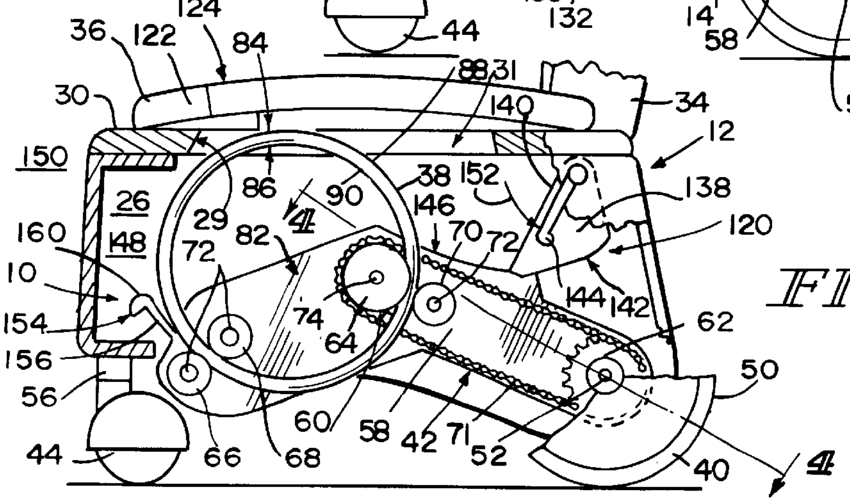
FIG. 3 is a partial cutaway left side elevation view similar to FIG. 2 showing the power ring in the second position wherein the entire power ring is disposed below the upper surface of the side compartment of the wheelchair.
Figure 4:
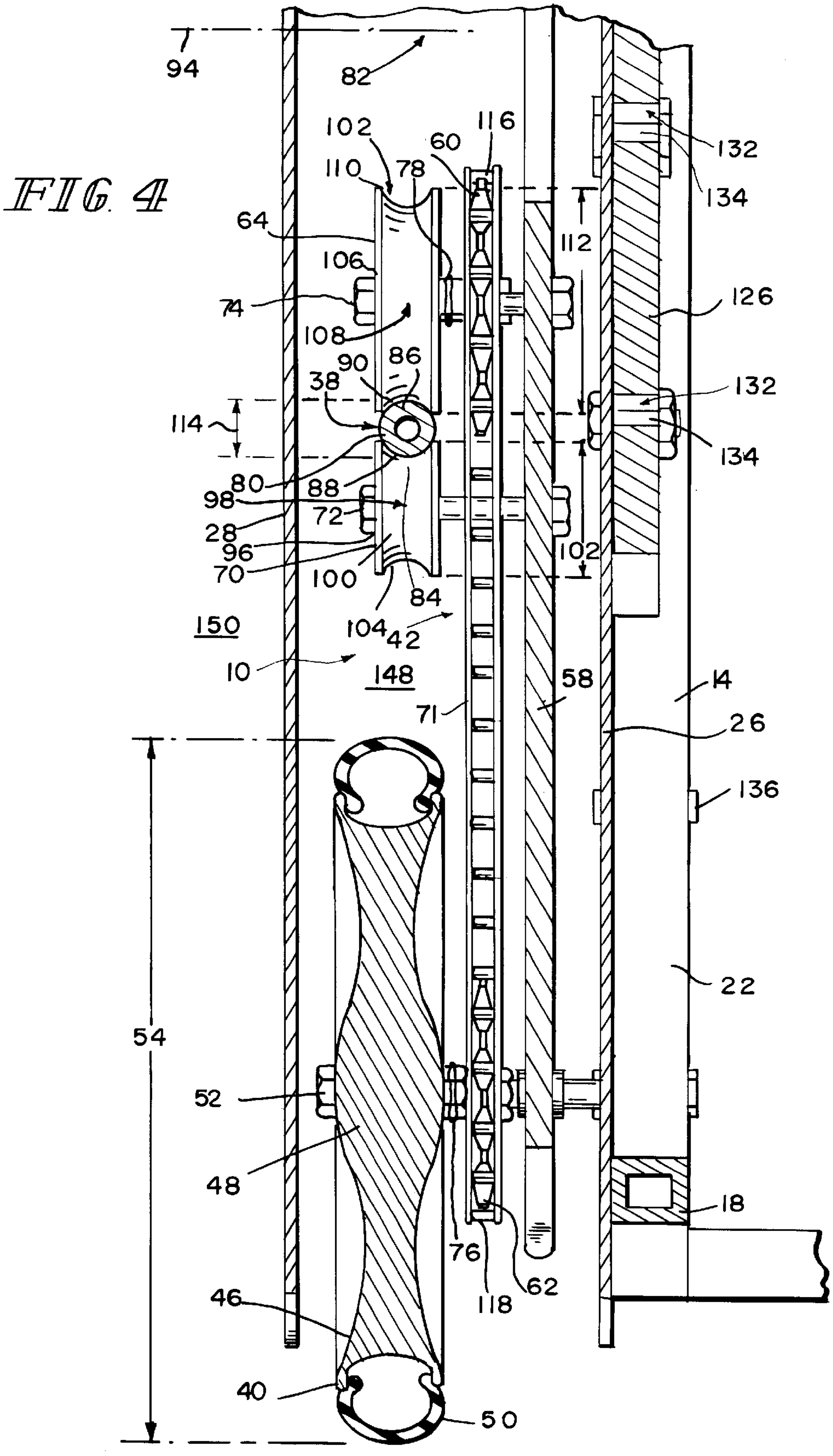
FIG. 4 is a cross sectional view along line 4—4 of FIG. 3 showing the power ring pinched between two pinch rollers rotatably mounted to a positioning bracket with one of the pinch rollers being a drive pinch roller mounted to a drive sprocket for receiving a chain which is also received in a driven sprocket mounted to a drive wheel.

Power ring 38 is illustrated as being constructed from a tubular material bent in a circular manner so that opposite ends of the tube are connected to each other to form a torroid, as shown for example, in FIGS. 2–4. The circular cross-section 80 of power ring 38 increases the comfort of the occupant in that there are no corners or edges that might create pressure points when the occupant engages power ring 38 with his or her hands. Illustratively, the cross sectional area of power ring 38 is sized to provide comfort to the occupant when power ring 38 is grasped. While it may reduce the comfort to the occupant, the present invention envisions that power ring 38 may be fabricated from square stock, rectangular stock, hexagonal stock, elliptical stock, and the like, formed into a continuous ring.

Power ring 38 includes a focus 82 located at the center of the ring, a concentric outer surface 84, and a concentric inner surface 86. Concentric inner surface 86 and concentric outer surface 84 are concentrically located about focus 82 and are the innermost and outermost surfaces radially of power ring 38 respectively. Power ring 38 also includes an outer surface 88 being defined as the exterior surface of power ring 38 adjacent to, abutting, and including concentric outer surface 84 and an inner surface 90 being defined as the exterior surface of power ring 38 adjacent to, abutting, and including concentric inner surface 86. Power ring 38 is mounted to bracket 58 so that the power ring 38 rotates bidirectionally as indicated by double-headed arrow 92 shown in FIG. 2 about an imaginary axis of rotation 94 passing through focus 82, as shown, for example, in FIG. 1. Power ring 38 is rotatably mounted to bracket 58 by being pinched between outer forward pinch roller 66, inner forward pinch roller 68, outer rear pinch roller 70, and drive pinch roller 64, as shown, for example, in FIGS. 2–4.

In the illustrated embodiment outer forward pinch roller 66, inner forward pinch roller 68, and outer rear pinch roller 70 are identical except for their attachment locations and each includes a hub 96 having a focus 98 and a diameter 102 and a conformally shaped ring-engaging surface 100. As shown in FIGS. 2–4, drive pinch roller 64 is similar to pinch rollers 66, 68, 70 in that it includes a hub 106 having a focus 108 and a diameter 112 and a conformally shaped ring-engaging surface 110. As shown, for example, in FIG. 4, diameter 112 of drive pinch roller 64 is larger than diameter 102 of pinch rollers 66, 68, 70. However, since power ring 38 has a circular cross-section 80, both conformally shaped ring-engaging surfaces 100, 110 have a concave cross section 102. Therefore, outer surface 88 of power ring 38 is received in and engaged by conformally shaped ring-engaging surfaces 100 of outer forward pinch roller 66 and outer rear pinch roller 70 and inner surface 90 of power ring 38 is received in and engaged by conformally shaped ring-engaging surfaces 100, 110 of inner forward pinch roller 68 and drive pinch roller 64 as shown, for example, in FIG. 4.

The conformal shaping of the engaging surfaces 100,110 of pinch rollers 64, 66, 68, 70 allow pinch rollers to aid in defining the plane in which power ring 38 will rotate. In order to define imaginary axis 94 about which the power ring 38 rotates, each pinch roller must be positioned on bracket 58 so that the point of intersection of conformally shaped ring-engaging surface 100, 110 with a line intersecting focus 98, 108 of pinch roller 64, 66, 68, 70 and focus 82 of power ring 38 lies on a circle centered on focus 82 of power ring 38. The pinch rollers are arranged so that outer forward pinch roller 66 and outer rear pinch roller 70 engage concentric outer surface 84 of power ring 38 while inner forward pinch roller 68 and drive pinch roller 64 engage concentric inner surface 86 of power ring 38 thereby restricting the movement of power ring 38 to rotation about focus 82 and axis of rotation 94.

Referring to FIGS. 3 and 4, outer forward pinch roller 66 is rotatably mounted to bracket 58 by fastener 72 acting as a pivot pin or axle passing through focus 98 of hub 96 of outer forward pinch roller 66 and bracket 58. Conformally shaped ring-engaging surface 100 of outer forward pinch roller 66 rotates about the pivot axis of outer forward pinch roller 66 and engages outer surface 88 of power ring 38.

Inner forward pinch roller 68 is rotatably mounted to bracket 58 by a pin or fastener 72 acting as a pivot pin or axle passing through focus 98 of hub 96 of inner forward pinch roller 68. Conformably shaped ring-engaging surface 100 of inner forward pinch roller 68 rotates about pivot axis of inner forward pinch roller 68 and engages inner surface 90 of power ring 38.

Inner forward pinch roller 68 is positioned so that it cooperates with outer forward pinch roller 66 to pinch power ring 38 therebetween. Outer forward pinch roller 66 and inner forward pinch roller 68 are positioned so that the portion of conformably shaped ring-engaging surface 100 of outer forward pinch roller 66 which engages the concentric outer surface 84 of power ring 38 is displaced radially from the portion of conformably shaped ring-engaging surface 100 of inner forward pinch roller 68 which engages the concentric inner surface 86 of power ring 38 by a distance approximately equal to the distance between the concentric inner surface 86 of power ring 38 and the nearest concentric outer surface 84 of power ring 38, i.e. the diameter 114 of cross-section 80 of power ring 38.

Outer rear pinch roller 70 is rotatably mounted to bracket 58 by fastener 72 acting as a pivot pin or axle passing through focus 98 of hub 96 of outer rear pinch roller 70 and bracket 58. Conformally shaped ring-engaging surface 100 of outer rear pinch roller 70 rotates about the pivot axis of outer rear pinch roller 70. Conformally shaped ring-engaging surface 100 of outer rear pinch roller 70 engages outer surface 88 of power ring 38.

Drive pinch roller 64 is rotatably mounted to the bracket 58 by fastener 74 acting as pivot pins or axles through focus 108 of hub 106 of drive pinch roller 64. Conformally shaped ring-engaging surface 110 of drive pinch roller 64 rotates about pivot axis of drive pinch roller 64 and engages inner surface 90 of power ring 38.

Drive pinch roller 64 is positioned so that it cooperates with outer rear pinch roller 70 to pinch power ring 38 therebetween. Outer rear pinch roller 70 and drive pinch roller 64 are positioned so that the portion of conformally shaped ring-engaging surface 100 of outer rear pinch roller 70 which engages the concentric outer surface 84 of power ring 38 is displaced from the portion of conformally shaped ring-engaging surface 110 of drive pinch roller 64 which engages the concentric inner surface 86 of power ring 38 by a distance approximately equal to the diameter 114 of cross-section 80 of power ring 38.

In order to increase the effective engagement of power ring 38 and drive pinch roller 64, conformally shaped ring-engaging surface 110 of drive pinch roller 64, or inner surface 90 of power ring 38, may be formed of a compressible material to increase the coefficient of friction and thereby the frictional force between drive pinch roller 64 and power ring 38. Frictional forces between drive pinch roller 64 and power ring 38 cause drive pinch roller 64 to be rotated when power ring 38 is rotated by the occupant.

In order to cause the drive wheel 40 to rotate upon rotation of power ring 38, drive pinch roller 64 is coupled to drive wheel 40. There are many ways in which this coupling may occur including, but not limited to, gears, frictional engagement, and continuous loop couplers such as belts, and chains. In the first illustrated embodiment of the drive apparatus 10, coupling of drive pinch roller 64 and drive wheel 40 is accomplished by chain 71, as shown for example in FIGS. 2–4.

Drive sprocket 60 is coupled to drive pinch roller 64 so that rotation of the drive pinch roller 64 induces rotation of the drive sprocket 60. Drive sprocket 60 has multiple teeth 116 sufficiently spaced to allow for receipt of the chain 71 therebetween. Likewise, drive wheel 40 is coupled to driven sprocket 62 so that rotation of the driven sprocket 62 induces rotation of drive wheel 40. Driven sprocket 62 also has multiple teeth 118 sufficiently spaced to allow for receipt of the chain 71 therebetween.

Chain 71 is received in drive sprocket 60 and driven sprocket 62 to couple drive sprocket 60 to driven sprocket 62 and thereby drive pinch roller 64 to drive wheel 40. Rotation of power ring 38, through frictional engagement with drive pinch roller 64, induces drive pinch roller 64 and drive sprocket 60 to rotate. Chain 71 transfers this rotation to driven sprocket 62 and drive wheel 40. Rotation of drive wheel 40 induces movement of wheelchair 12 across the surface when power ring 38 is rotated. Counter-clockwise rotation (as viewed from the left side of wheelchair 12 as depicted in FIGS. 2 and 3) of power ring 38 induces forward movement of wheelchair 12 and clockwise rotation of power ring 38 induces rearward movement of wheelchair 12.

As shown in FIGS. 1–4 ring-to-drive wheel coupler 42 is positioned to lie between inner wall 26 and outer wall 28 of side compartment 24 and below upper surface 30 of side compartment 24. Therefore ring-to-drive wheel coupler 42 is enclosed in side compartment 24 preventing accidental contact of pinch rollers 64, 66, 68, 70 or chain 71 by an occupant of wheelchair 12. Enclosure of ring-to-drive wheel coupler 42 within side compartment 24 also causes wheelchair 12 to more closely resemble a conventional armchair or recliner than traditional wheelchairs.

Often occupants of wheelchairs need to move themselves, or be moved by others, from the wheelchair to a bed or other chair. A wall 29 extends downwardly from upper surface 30 of side compartment 24 to form an opening 31 extending between interior 148 and exterior 150 of side compartment 24. Wheelchair 12 includes collapsible armrests 36 and retractor/extender 120 for rotating the power ring 38 downward into a retracted position in which no portion of power ring 38 extends above upper surface 30 of side compartment 24 and an extended position in which a substantial portion of power ring 38 extends above upper surface 30 of side compartment 24. Thus wheelchair 12 may be configured to facilitate movement of the occupant from wheelchair 12 to another location. Additionally, when the occupant reaches a location, the power rings 38 can be lowered to alter the appearance of wheelchair 12 so that it more closely resembles an armchair or recliner.

Collapsible armrest 36 includes an arm supporting member 122 having an upper surface 124 configured to receive the arm of an occupant of wheelchair 12 and an arm bracket 126 having a top surface 128 and a bottom surface 130 and being formed to include a plurality of slots 132, as shown for example in FIGS. 2–6. Arm supporting member 122 is attached to top surface 128 of arm bracket 126. Arm bracket 126 is mounted for movement relative to side compartment 24 by a plurality of fasteners acting as guides 134 extending through the plurality of slots 132 and through inner wall 26 of side compartment 24. Guides 134 slide within slots 132 to allow armrest 36 to assume an elevated position as shown for example in FIG. 1, and a collapsed position as shown for example in FIGS. 2 and 3. Illustratively, in the collapsed position the upper surface 124 of armrest 36 extends only slightly above the level of seat 32 and upper surface 30 of side compartment 24 to reduce the height that an occupant must be lifted for transfer from the wheelchair 12 to another surface such as a bed or conventional chair. It should be understood that it is within the scope of the invention to provide an armrest 36 which in the collapsed position has its upper surface 124 below the level of the seat 32 and upper surface 30 of side compartment 24. Wheelchair 12 also includes a locking mechanism, not shown, for securing armrest 36 in the elevated position. Mechanisms for creating collapsible armrests and locking mechanisms are well known, the description contained herein being merely illustrative. One example of such a mechanism is disclosed in Hanson et al., Ambulatory Care Chair, U.S. patent application Ser. No. 08/798,317, assigned to Hill Rom, Inc., the assignee of this application, the disclosure of which is incorporated herein by reference.

Since power ring 38 is connected to bracket 58 which is pivotally connected to frame 14, power ring 38 is connected for movement relative to frame 14. Side compartment 24 is fixedly attached to frame 14 by fasteners 136 extending through inner wall 26 and frame 14 as shown in FIG. 4. Therefore, power ring 38 is also attached for movement relative to upper surface 30 of side compartment 24. Power ring 38 may assume an extended position in which a substantial portion of each power ring 38 extends above upper surface 30 of side compartment 24 so that power ring 38 may be engaged and rotated by the occupant of wheelchair 12, and a retracted position in which power ring 38 is located entirely below upper surface 30 of side compartment 24 and the upper surface 124 of armrest 36 when armrest 36 is in the collapsed position, as shown, for example, in FIG. 3.

Retractor/extender 120 includes an actuator 138 for actuating movement of bracket 58 to position power ring 38 in either the extended or retracted position. In the illustrated embodiment actuator 138 includes a cam body 140 having a camming surface 142 and a handle 144 connected to rotate cam body 140. Bracket 58 further includes a follower surface 146. Actuator 138 is rotatably mounted to outer wall 28 of side compartment 24 so that handle 144 is positioned on exterior 150 of side compartment 24 and cam body 140 is positioned in interior 148 of the side compartment 24 with camming surface 142 in engagement with follower surface 146 of bracket 58. When an occupant rotates handle 144 in the direction of arrow 152, camming surface 142 rides along follower surface 146 to move power ring 38 into the retracted position as shown, for example, in FIGS. 2 and 3.

Wheelchair 12 also includes a ring-locking mechanism 154 for selectively locking power ring 38 in the extended position. Illustratively locking mechanism 154 includes a flexible leaf spring 156 connected at one end to bracket 58 and a catch handle 160 connected at the opposite end of leaf spring 156. When power ring 38 is raised, catch handle 160 contacts wall 29 extending from upper surface 30 of side compartment 24 and rides along wall 29 flexing leaf spring 156 to allow catch handle 160 to pass through opening 31. When catch handle 160 has passed through opening 31, leaf spring 156 urges catch handle 160 forward so that bottom surface of catch handle 160 catches on upper surface 30 of side compartment 24, as shown, for example, in FIG. 2. To lower power ring 38, occupant pulls on catch handle 160 to flex leaf spring 156 until catch handle 160 can again pass through opening 31 during the lowering of power ring 38. Other locking mechanisms are well known and are not described herein, but are nevertheless within the scope of the invention.

Figure 5:
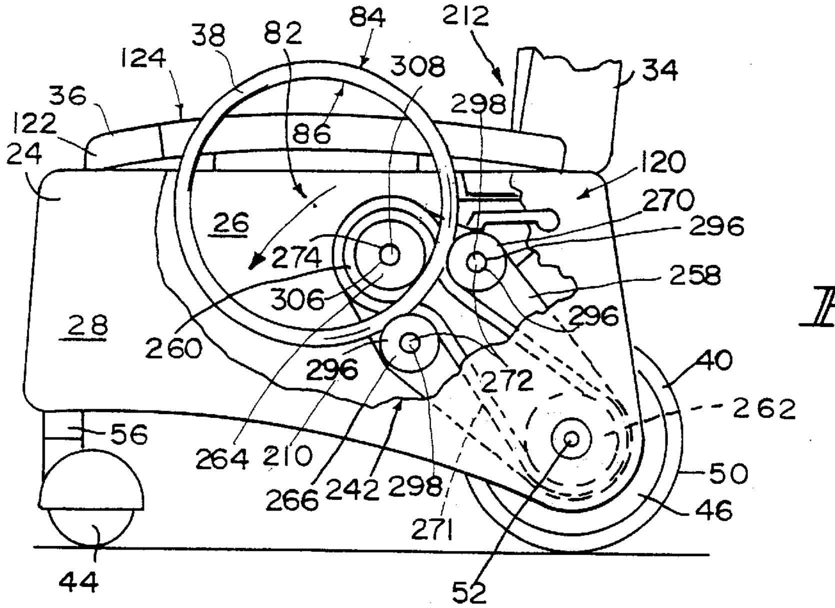
FIG. 5 is a partial cutaway left side elevation view of a second embodiment of the apparatus for propelling a wheelchair according to the present invention showing the power ring pinched between three pinch rollers with one of the pinch rollers being the drive pinch roller which is coupled to the drive wheel by a belt extending around a drive pulley attached to the drive pinch roller and a driven pulley attached to the drive wheel.

FIG. 5 illustrates a second embodiment of the apparatus 210 for propelling a wheelchair 212 in accordance with the present invention. Wheelchair 212 differs from wheelchair 12 in the configuration of the ring-to-drive wheel coupler 242.

Ring-to-drive wheel coupler 242 includes a bracket 258, a drive pulley 260, a driven pulley 262, a drive pinch roller 264, a plurality of pinch rollers 266, 270 and a belt 271. In wheel chair 212 the plurality of pinch rollers include forward outer pinch roller 266 and a rear outer pinch roller 270. Forward outer pinch roller 266 and a rear outer pinch roller 270 are identical except for their mounting locations and are rotatably mounted to the bracket 258 by fasteners 272 acting as pivot pins. Drive pinch roller 264 is rotatably mounted to bracket 258 by a fastener 274 acting as a pivot pin or axle.

Bracket 258 is pivotally mounted to frame 14 by the same fastener 52 acting as pivot pin that rotatably attaches drive wheel 40 to frame 14. Fastener 52 also rotatably mounts driven pulley 262 to bracket 258 and to frame 14. In order for rotation of driven pulley 262 to induce rotation of drive wheel 40, driven pulley 262 and drive wheel 40 are coupled to prevent relative movement between the two.

Drive pulley 260 is rotatably mounted to bracket 258 by the same fastener 274 that rotatably mounts drive pinch roller 264 to bracket 258. In order for rotation of drive pinch roller 264 to induce rotation of drive pulley 260, drive pulley 260 and drive pinch roller 264 are coupled to prevent relative movement between the two.

Power ring 38 is rotatably mounted to bracket 258 which in turn is pivotally mounted to frame 14 of wheelchair 212. Power ring 38 is illustrated as being constructed from a tubular material bent in a circular manner so that opposite ends of the tube are connected to each other to form a torroid.

In wheelchair 212, forward outer pinch roller 266 and rear outer pinch roller 270 are identical except for their attachment locations and include a hub 296 having a focus 298 and a conformally shaped ring-engaging surface (not shown). Since power ring 38 has a circular cross-section 80, conformally shaped ring-engaging surface (not shown) has a concave cross section so that outer surface 88 of power ring 38 is engaged by forward outer pinch roller 266 and rear outer pinch roller 270.

Drive pinch roller 264 is rotatably mounted to bracket 258 by fastener 274 acting as pivot pins or axles through focus 308 of hub 306 of drive pinch roller 264. Conformally shaped ring-engaging surface (not shown) of drive pinch roller 264 rotates about pivot axis of drive pinch roller 264 and engages inner surface 90 of power ring 38.

The conformal shaping of the engaging surfaces (not shown) of pinch rollers 264, 266, 270 allow the pinch rollers to aid in defining the plane in which power ring 38 will rotate. In order to define imaginary axis 94 about which power ring 38 rotates, each pinch roller must be positioned on bracket 58 so that the point of intersection of the conformally shaped ring-engaging surface (not shown) with a line intersecting focus 298, 308 of pinch roller 264, 266, 270 and focus 82 of power ring 38 lies on a circle centered on focus 82 of power ring 38. The pinch rollers are arranged so that forward outer pinch roller 266 and rear outer pinch roller 270 engage the concentric outer surface 84 of power ring 38 while drive pinch roller 264 engages concentric inner surface 86 of power ring 38 thereby restricting the movement of power ring 38 to rotation about focus 82 and axis of rotation 94.

Referring to FIG. 5, forward outer pinch roller 266 is connected to bracket 258 by fastener 272 acting as a pivot pin or axle passing through focus 298 of hub 296 of forward outer pinch roller 266 and bracket 258. Conformally shaped ring-engaging surface (not shown) rotates about pivot axis of forward outer pinch roller 266 and engages outer surface 88 of power ring 38.

Rear outer pinch roller 270 is connected to bracket 258 by fastener 272 acting as a pivot pin or axle passing through focus 298 of hub 296 of rear outer pinch roller 270 and bracket 258. Conformally shaped ring-engaging surface (not shown) rotates about the pivot axis of rear outer pinch roller 270. Conformably shaped ring-engaging surface (not shown) of rear outer pinch roller 270 engages outer surface 88 of power ring 38.

Drive pinch roller 264 is rotatably mounted to the bracket 258 by fastener 274 acting as pivot pin or axle through focus 308 of hub 306. Drive pinch roller 264 is positioned so that it cooperates with forward outer pinch roller 266 and rear outer pinch roller 270 to pinch power ring 38 therebetween. Forward outer pinch roller 266, rear outer pinch roller 270 and drive pinch roller 264 are positioned so that the portions of conformably shaped ring-engaging surface (not shown) of forward outer pinch roller 266 and rear outer pinch roller 270 which engage concentric outer surface 84 of power ring 38 are radially displaced from the portion of conformably shaped ring-engaging surface (not shown) of drive pinch roller 264 which engages concentric inner surface 86 of power ring 38 by a distance approximately equal to the diameter 114 of cross-section 80 of power ring 38.

Drive pulley 260 is coupled to drive pinch roller 264 so that rotation of the drive pinch roller 264 induces rotation of drive pulley 260. Drive pulley 260 is designed to receive and frictionally engage belt 271. Likewise, the drive wheel 40 is coupled to driven pulley 262 so that rotation of the driven pulley 262 induces rotation of the drive wheel 40. Driven pulley 262 is designed to receive and frictionally engage belt 271.

Belt 271 is received in drive pulley 260 and driven pulley 262 to couple drive pulley 260 to driven pulley 262 and thereby couple drive pinch roller 264 to drive wheel 40. Rotation of the power ring 38, through frictional engagement with drive pinch roller 264, causes drive pinch roller 264 and drive pulley 260 to rotate. Belt 271 transfers this rotation to driven pulley 262 and drive wheel 40. Rotation of drive wheel 40, as a result of frictional engagement between tire 50 and the surface upon which wheelchair 212 is sitting, induces movement of wheelchair 212 across the surface when power ring 38 is rotated. Counter-clockwise rotation (as viewed from the left side of wheelchair 212 as depicted in FIG. 5) of power ring 38 induces forward movement of wheelchair 212 and clockwise rotation of power ring 38 induces rearward movement of wheelchair 212.

Figure 6:
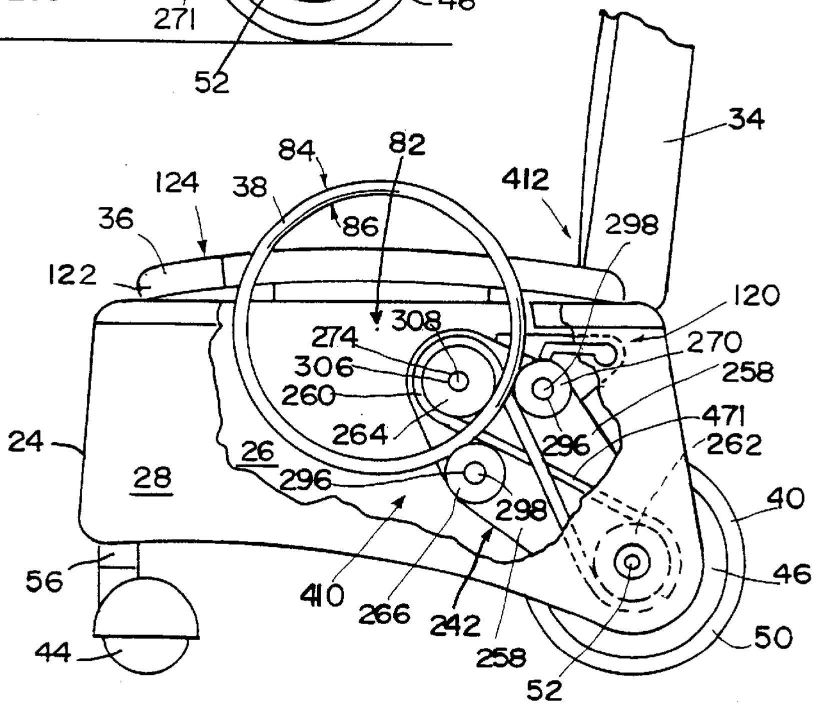
FIG. 6 is a partial cutaway side elevation view of a third embodiment of an apparatus for propelling a wheelchair according to the present invention showing the power ring rotatably mounted to the wheelchair by three pinch rollers, the drive pinch roller being coupled to the drive pulley for accepting a belt extending between the drive pulley and the driven pulley coupled to the drive wheel with the belt being crossed so that clockwise rotation of the power ring will result in counterclockwise rotation of the drive wheel and vice versa.

FIG. 6 illustrates a third embodiment of the apparatus 410 for propelling a wheelchair 412 in accordance with the present invention. Wheelchair 412 is similar to wheelchair 212 except that belt 471 is crossed in wheelchair 412. Therefore clockwise rotation (looking from the side as in FIG. 6) of power ring 38 induces forward movement of wheelchair 412 whereas counterclockwise rotation of power ring 38 induces forward movement of wheelchairs 12 and 212. Similarly, rearward movement of wheelchair 412 is reduced by counterclockwise rotation of power ring 38.

Although the invention has been described in detail with reference to certain preferred embodiments, variations and modifications exist within the scope and spirit of the invention as described and defined in the following claims.

What is claimed is:

1. An apparatus for propelling a wheelchair, the apparatus comprising:

a spokeless power ring adapted to be connected to the wheel chair, a drive wheel adapted to support the chair and engage a floor, and a system configured to drivingly couple the spokeless power ring and the drive wheel together such that rotation of the power ring drives the drive wheel proportional to the rotation of the power ring, the system including a rotary element rotatable about a central axis of the rotary element and engaging the spokeless power ring so that rotation of the spokeless power ring about a central axis of the spokeless power ring causes the rotary element to rotate relative to the spokeless power ring to drive the drive wheel.

2. The apparatus of claim 1, wherein the drive wheel is configured to rotate about an axis of rotation that is offset a fixed distance from the central axis of the spokeless power ring when the spokeless power ring rotates the rotary element to drive the drive wheel.

3. The apparatus of claim 1, wherein the central axis of the spokeless power ring is offset from the central axis of the rotary element.

4. The apparatus of claim 1, wherein the spokeless power ring is hoop-shaped to define a central opening to allow fingers of an occupant of the wheelchair to be inserted through the central opening to grip the spokeless power ring to permit the occupant to rotate the spokeless power ring.

5. An apparatus for propelling a wheelchair the apparatus comprising:

a spokeless power ring adapted to be connected to the wheel chair, a drive wheel adapted to support the chair and engage a floor, and the power ring and drive wheel being drivingly coupled by a system which includes a pinch roller configured to interface with the power ring so that rotation of the power ring causes the pinch roller to rotate, a driven sprocket rotatably connected to the drive wheel so that rotation of the driven sprocket causes the drive wheel to rotate, and an endless drive element interconnecting the pinch roller and the driven sprocket such that rotation of the power ring causes the drive wheel to rotate such that rotation of the power ring drives the drive wheel proportional to the rotation of the power ring.

6. The apparatus of claim 5, wherein the endless drive element is configured to interact with the pinch roller and driven sprocket such that counter-clockwise rotation of the power ring causes counter-clockwise rotation of the drive wheel.

7. The apparatus of claim 5, wherein the pinch roller includes a drive pinch roller for interacting with the power ring and a drive sprocket appended to the drive pinch roller for interacting with the endless drive element.

8. The apparatus of claim 7, wherein the drive pinch roller is designed to pinch the power ring against a portion of the wheelchair to keep the power ring in a fixed position relative to the wheelchair and to provide a contact surface which enables rotation of the power ring to cause rotation of the pinch roller.

9. The apparatus of claim 7, wherein the drive sprocket is configured to lie in a spaced-apart relation to the power ring to prevent interference between the endless drive element and the power ring upon rotation of the power ring.

10. An apparatus for propelling a chair across a surface upon which the chair rests, the apparatus comprising:

a chair frame designed and arranged to accommodate an occupant, a propulsion mechanism attached to the chair frame and including a surface-engaging component for engaging the surface for propelling the chair frame across the surface, and a spokeless power ring rotatably mounted to the chair frame and operably coupled to the propulsion mechanism so that rotation of the power ring activates the propulsion mechanism, the propulsion mechanism including a roller engaging the spokeless power ring, rotation of the spokeless power ring by the occupant rotating the roller relative to the spokeless power ring to cause the propulsion mechanism to propel the chair frame across the surface.

11. The apparatus of claim 10 wherein the surface-engaging component includes a surface-engaging wheel rotatably mounted to the chair frame.

12. The apparatus of claim 11 wherein the wheel has an axis of rotation that is substantially parallel to the surface when the apparatus is located on the surface.

13. The apparatus of claim 12 wherein the power ring rotates about an axis which is parallel to, but displaced from, the axis of rotation of the wheel.

14. The apparatus of claim 10, wherein the spokeless power ring is configured to rotate about a central axis of the spokeless power ring and the drive wheel is configured to rotate about a central axis of the drive wheel and the central axis of the spokeless power ring is offset a fixed distance from the central axis of the drive wheel when the spokeless power ring rotates the roller to cause the propulsion mechanism to propel the chair frame across the surface.

15. An apparatus for propelling a chair across a surface upon which the chair rests, the apparatus comprising:

a chair frame designed and arranged to accommodate an occupant, a propulsion mechanism attached to and at least partially extending below the chair frame and including a surface-engaging component for engaging the surface for propelling the chair frame across the surface, a spokeless power ring rotatably mounted to the chair frame and operably coupled to the propulsion mechanism so that rotation of the power ring activates the propulsion mechanism, wherein the surface-engaging component includes a surface-engaging wheel rotatable mounted to the chair frame, the wheel has an axis of rotation that is substantially parallel to the surface when the apparatus is located on the surface, the power ring rotates about an axis which is parallel to, but displaced from, the axis of rotation of the wheel, and further having a roller rotatably mounted to the chair frame so as to engage the power ring and to rotate when the spokeless power ring is rotated by the occupant, the roller being coupled to the propulsion mechanism so that rotation of the roller induces the propulsion mechanism to propel the chair frame across the surface.

16. The apparatus of claim 15 having a continuous loop coupler extending between the propulsion mechanism and the roller and arranged to couple the roller and the propulsion mechanism.

17. The apparatus of claim 16 wherein the roller is disposed entirely above the surface-engaging wheel.

18. The apparatus of claim 17 wherein the roller has a roller rotation axle rotatably connecting the roller to the chair frame and the continuous loop coupler extends between the roller axle and the propulsion mechanism so that rotation of the roller induces the propulsion mechanism to propel the chair across the surface.

19. The apparatus of claim 18 wherein the roller rotation axle includes a pulley engaging the continuous loop coupler, the propulsion mechanism includes a propulsion mechanism axle rotatably connecting the propulsion mechanism to the chair frame and a pulley attached to the propulsion mechanism axle and engaging the continuous loop coupler.

20. The apparatus of claim 18 wherein the roller has a toothed sprocket attached to the roller axle, the propulsion mechanism has a propulsion mechanism axle for rotatable connecting the propulsion mechanism to the chair frame and a toothed sprocket attached to the propulsion mechanism axle and the continuous loop fastener is a chain.

21. The apparatus of claim 15 having a pinch roller rotatably attached to the chair frame cooperable with the roller, the roller and pinch roller being arranged to pinch the power ring between the roller and the pinch roller.

22. The apparatus of claim 21 wherein the power ring is substantially toroidal.

23. The apparatus of claim 21 wherein the chair frame further includes a positionable bracket and the power ring is rotatable mounted to the bracket, the bracket being selectively positionable between an accessible position wherein the power ring is accessible to an occupant of the chair frame and an inaccessible position wherein the power ring is inaccessible to an occupant of the chair frame.

24. The apparatus of claim 23 and further including a selector attached to the chair frame and affecting the positionable bracket to select whether the positionable bracket is in the accessible position or the nonaccessible position.

25. A wheel chair having spaced apart sides and a seating surface disposed between spaced apart sides for receipt of an occupant, the wheel chair comprising:

support wheels including at least one driven wheel, a spokeless power ring mounted at each side of the chair for access by the occupant, said power ring being mounted for rotation when moved by the occupant, and drive elements mounted on each side of the chair to provide a driving connection between their associated power ring and the at least one driven wheel, the drive elements including a drive pinch roller engaging the respective spokeless power ring so that rotation of the respective spokeless power ring causes the drive pinch roller to rotate to drive the at least one driven wheel.

26. A wheel chair having spaced apart sides and a seating surface disposed between the spaced apart sides for receipt of an occupant, the wheel chair comprising:

support wheels including at least one driven wheel, a spokeless power ring mounted at each side of the chair for access by the occupant, said power ring being mounted for rotation by the occupant, and drive elements mounted on each side of the chair to provide a driving connection between their associated power ring and the at least one driven wheel, the drive elements including a plurality of pinch rollers including a drive roller engaging the power ring and a driven roller coupled to the driven wheel.

27. The apparatus of claim 26 wherein the drive elements include an endless drive element coupling the drive roller to the driven roller.

28. The apparatus of claim 27 wherein the endless drive element comprises a chain.

* * * * *